(12) United States Patent
Mori et al.

(10) Patent No.: US 7,817,025 B2
(45) Date of Patent: Oct. 19, 2010

(54) APPARATUS FOR DETECTING VEHICLE WHEEL POSITIONS BASED ON RECEPTION INTENSITIES OF TRIGGERING SIGNALS OUTPUTTED SIMULTANEOUSLY

(75) Inventors: Masashi Mori, Oobu (JP); Nobuya Watabe, Nagoya (JP)

(73) Assignee: Denso Corporation, Kariya (JP)

( * ) Notice: Subject to any disclaimer, the term of this patent is extended or adjusted under 35 U.S.C. 154(b) by 459 days.

(21) Appl. No.: 11/963,238

(22) Filed: Dec. 21, 2007

(65) Prior Publication Data

US 2008/0150711 A1   Jun. 26, 2008

(30) Foreign Application Priority Data

Dec. 26, 2006   (JP) .............................. 2006-349399

(51) Int. Cl.
B60C 23/00   (2006.01)
(52) U.S. Cl. ...................... 340/447; 340/442; 73/146.5
(58) Field of Classification Search ................. 340/442, 340/445, 447, 539.1; 73/146, 146.2, 146.4, 73/146.5
See application file for complete search history.

(56) References Cited

U.S. PATENT DOCUMENTS

| 5,602,524 A | 2/1997 | Mock et al. |
| 6,879,252 B2 | 4/2005 | DeZorzi et al. |
| 6,888,446 B2 | 5/2005 | Nantz et al. |
| 2004/0172179 A1 | 9/2004 | Miwa |
| 2005/0253696 A1 | 11/2005 | Mori et al. |
| 2006/0006992 A1 | 1/2006 | Daiss et al. |
| 2007/0008097 A1 | 1/2007 | Mori et al. |

FOREIGN PATENT DOCUMENTS

| JP | H7-507513 | 8/1995 |
| JP | 2005-350046 | 12/2005 |
| JP | 2007-015491 | 1/2007 |

OTHER PUBLICATIONS

U.S. Appl. No. 11/964,259, filed Dec. 2007, Mori et al.
U.S. Appl. No. 11/957,025, filed Dec. 2007, Mori et al.
Chinese Office Action dated Aug. 21, 2009, issued in corresponding Chinese Application No. 200710199795.3, with English translation.

*Primary Examiner*—Jeffery Hofsass
(74) *Attorney, Agent, or Firm*—Nixon & Vanderhye PC

(57) ABSTRACT

In a vehicle's wheel position detecting apparatus, a first triggering device, attached to the vehicle's body, outputs a triggering signal including information indicating that the triggering signal is for front wheels. A second trigging device, attached to the body, outputs a triggering signal including information indicating that the triggering signal is for rear wheels. The first and second triggering devices output the triggering signals simultaneously. A transceiver is attached to each of the front and rear four wheels. Each transceiver receives the triggering signal, calculates a reception intensity of the triggering signal, stores both the reception intensity data and the information into a frame, and transmits the frame. A receiver, attached to the body, receives the frame and processes the received frame to read out both the data and the information and use the read-out data and information to detect the positions of the wheels.

20 Claims, 5 Drawing Sheets

US 7,817,025 B2

APPARATUS FOR DETECTING VEHICLE WHEEL POSITIONS BASED ON RECEPTION INTENSITIES OF TRIGGERING SIGNALS OUTPUTTED SIMULTANEOUSLY

CROSS-REFERENCE TO RELATED APPLICATION

This application is based on and claims the benefit of priority from earlier Japanese patent Application No. 2006-349399 filed Dec. 26, 2006, the description of which is incorporated herein by reference.

BACKGROUND OF THE INVENTION

1. Field of the Invention

The present invention relates to an apparatus for detecting the wheel positions of a vehicle, on which respective wheels are installed, and an apparatus for detecting the inflation pressure of the tires of a vehicle, such as a direct-type tire inflation pressure detection apparatus.

2. Description of the Related Art

A direct-type apparatus for detecting the inflation pressure of tires of a vehicle is known. This tire inflation pressure detecting apparatus is provided with a transceiver equipped with a sensor such as a pressure sensor, which is directly installed on each wheel with a tire. An antenna and a receiver are provided in the vehicle body. Thus, when the receiver receives, via the antenna, from the transmitter a detection signal detected by the sensor, the receiver is able to detect the inflation pressure of each tire based on the received detection signal.

In this direct-type tire inflation pressure detecting apparatus, it is determined whether or not data which has been received is coming from the transceiver of the own vehicle and it is determined on which of the wheels a transceiver in question is installed. For these determinations, as shown in U.S. Pat. No. 5,602,524 (which corresponds to Japanese Patent No. 3212311), data to be transmitted from each transceiver additionally contains ID (identification) information to distinguish the own vehicle from other vehicles and identify each wheel with the transceiver. The ID information is previously stored in the receiver and, when the receiver receives data from the transceiver, the stored ID information and the received ID information are used to determine the wheel the data is coming from.

However, the foregoing conventional detecting apparatus is confronted with a difficulty. Specifically, the determination of the respective wheels equipped with the respective transceivers requires that inherent ID information be contained in data transmitted from each transceiver. Hence, if the ID information is not used, it is impossible to distinguish data coming from each transceiver from data coming from other transceivers. That is, the positions of the respective wheels cannot be detected without using the ID information.

The foregoing conventional detecting apparatus is confronted with another difficulty. Specifically, when a user changes the positions of the tires by rotation, for example, the user has to read the ID information of the rotated tires and renew the ID information that has been registered up to then. Without doing this, the tire inflation pressure detecting apparatus cannot cope with the position change of the wheels.

Therefore, it is desired that a tire inflation pressure detecting apparatus can detect the wheels equipped with the respective transceivers without using the ID information (wheel-position information). In other words, it is desired that a tire inflation pressure detecting apparatus can detect the positions on which the respective transceivers are installed. Alternatively, where it is necessary to renew the ID information because of the position change of the wheels, the renewal of the ID data is desired to be automatically performed.

SUMMARY OF THE INVENTION

The present invention has been made in light of the circumstances described above, and has as its object to mitigate the complicated operation of wheel position detection, which is ascribed to the unwanted reception of triggering signals by those transceivers which are not desired to receive the triggering signals, in a wheel position detecting apparatus which is able to detect the correlation of the wheels with the respective transceivers installed on the wheels, without the need of performing readout, for example, of the ID information by the user.

In order to achieve the above object, in a first mode of the present invention, triggering signals outputted from a first triggering device are permitted to include information indicating that the triggering signals are for front wheels, while triggering signals outputted from a second triggering device are permitted to include information indicating that the triggering signals are for rear wheels. The triggering signals are simultaneously outputted from the first and second triggering devices, for reception by a first controlling unit provided in each of transceivers. The "simultaneously" means "simultaneity" decided on a triggering command signal designed.

Each of the transceivers can then store in a frame the information indicating that the triggering signal is for a front wheel or for a rear wheel, together with its reception intensity data. The frame is then transmitted from the transceiver for reception by a second controlling unit provided in a receiver. In the second control unit, correlation of the wheels with the respective transceivers is determined based on the information indicating that the triggering signals are for the front wheels or for the rear wheels and the reception intensity data.

The triggering signals are simultaneously outputted in this way from the first triggering device toward the right- and left front wheels, and from the second triggering device toward the right- and left rear wheels. Then, the transceivers installed on the right- and left front wheels can receive only the triggering signals outputted from the first triggering device, and the transceivers installed on the right- and left rear wheels can receive only the triggering signals outputted from the second triggering device. In this way, a wheel position detecting apparatus is able to detect whether the associated transceivers are installed on the right- and left front wheels or the right- and left rear wheels, without the user's necessity of reading out the ID information In addition, the wheel position detecting apparatus is able to prevent the triggering signals from being received by the transceivers which are not desired to receive the triggering signals to thereby mitigate the complicated operation of wheel position detection.

In particular, for the two reception intensity data stored in the respective frames which include the information indicating the triggering signals as being of front wheels, the second control unit can determine that the transceiver transmitting the frame storing the data of larger reception intensity, as being installed on one of the right- and left front wheels which is located closer to the first triggering device, and that the transceiver transmitting the frame storing the data of smaller reception intensity, as being installed on the other of the right- and left front wheels which is located further from the first triggering device. Similarly, in the two reception intensity data stored in the respective frames which include the information indicating the triggering signals as being of rear wheels, the second control unit can determine that the transceiver transmitting the frame storing the data of larger reception intensity, as being installed on one of the right- and left rear wheels which is located closer to the second triggering device, and that the transceiver transmitting the frame storing the data of smaller reception intensity, as being installed on the other of the right- and left rear wheels which is located further from the second triggering device.

In a second mode of the present invention, the triggering signals outputted by the first triggering device can include information indicating the triggering signals as being of the right wheels, and the triggering signals outputted by the second triggering device can include information indicating the triggering signals as being of the left wheels. Upon reception of the triggering signal, each of the first control units can store in a frame the information indicating the triggering signal as being of the right or left wheel, together with the reception intensity data and then can transmit the frame to the second controlling unit. Upon reception of the frame, the second control unit can identify the wheel on which the associated transceiver is installed, on the basis of the information indicating the triggering signal as being of the right or left wheel and the reception intensity data.

The triggering signals are simultaneously outputted in this way from the first triggering device toward the right wheels, and from the second triggering device toward the left wheels. Then, the transceivers installed on the right wheels can receive only the triggering signals outputted from the first triggering device, and the transceivers installed on the left wheels can receive only the triggering signals outputted from the second triggering device. In this way, a wheel position detecting apparatus is able to detect whether the associated transceivers are installed on the right wheels or the left wheels, without the user's necessity of reading out the ID information. In addition, the wheel position detecting apparatus is able to prevent the triggering signals from being received by the transceivers which are not desired to receive the triggering signals to thereby mitigate the complicated operation of wheel position detection.

In particular, in the two reception intensity data stored in the respective frames which include the information indicating the triggering signals as being of right wheels, the second control unit can determine that the transceiver transmitting the frame storing the data of larger reception intensity, as being installed on one of the two right wheels which is located closer to the first triggering device, and that the transceiver transmitting the frame storing the data of smaller reception intensity, as being installed on the other of the two right wheels which is located further from the first triggering device. Similarly, in the two reception intensity data stored in the respective frames which include the information indicating the triggering signals as being of left wheels, the second control unit can determine that the transceiver transmitting the frame storing the data of larger reception intensity, as being installed on one of the two left wheels which is located closer to the second triggering device, and that the transceiver transmitting the frame storing the data of smaller reception intensity, as being installed on the other of the two left wheels which is located further from the second triggering device.

Although the present invention in the above description is exemplified as a wheel position detecting apparatus, the wheel position detecting apparatus can be incorporated in a tire inflation pressure detecting apparatus. Also, although the present invention in the above description is taken as an invention of a system configuration serving as a wheel position detecting apparatus, it can also be taken as an invention of a transceiver or a receiver.

DETAILED DESCRIPTION OF THE PREFERRED EMBODIMENTS

Figure 1:
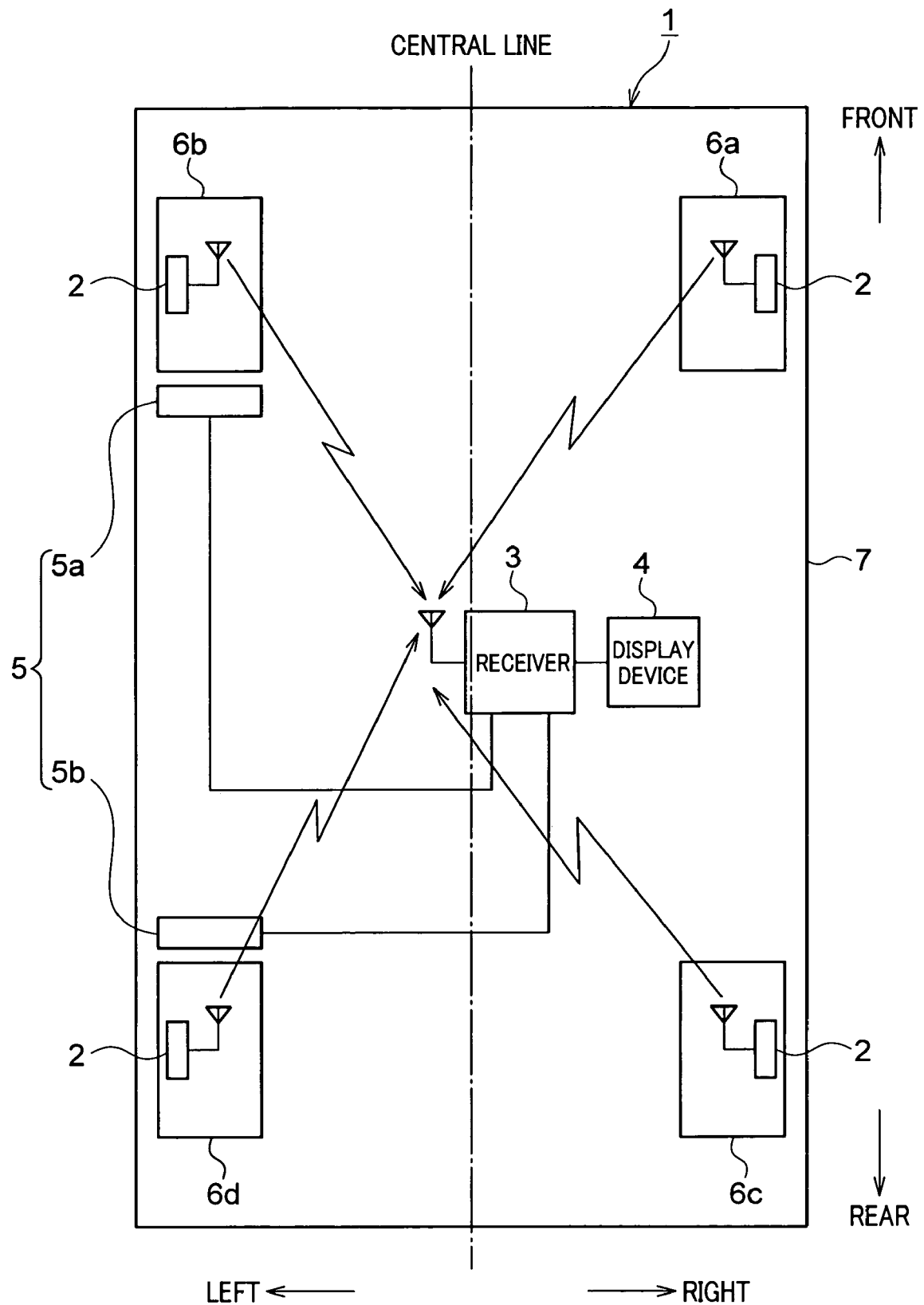
FIG. 1 is a block diagram generally illustrating a tire inflation pressure detecting apparatus to which a wheel position detecting apparatus is applied, according to a first embodiment of the present invention.

With reference to the accompanying drawings, hereinafter will be described some embodiments of the present invention. Throughout the embodiments, the identical or similar components, if any, are given the same reference numerals or symbols for the sake of omitting explanation.

First Embodiment

A first embodiment of the present invention will now be described referring to the drawings. FIG. 1 is a block diagram generally illustrating a tire inflation pressure detecting apparatus, in which a wheel position detecting apparatus is applied, according to a first embodiment of the present invention. A direction toward an upper portion of the drawing sheet of FIG. 1 corresponds to a frontward direction of a vehicle 1, and a direction toward a lower portion of the drawing sheet of FIG. 1 corresponds to a rearward direction of the vehicle 1. Referring to FIG. 1, a tire inflation pressure detecting apparatus according to the present invention is described.

As shown in FIG. 1, the tire inflation pressure detecting apparatus, which is or is to be mounted on a vehicle 1, includes four transceivers 2 (i.e., each serves as a transmitter/receiver), a receiver 3, a display device 4, and triggering devices 5. In the present embodiment, the transceivers 2, the receiver 3, and the triggering devices 5 compose the wheel position detecting apparatus according to the present invention.

Each of the transceivers 2 is mounted on one of the four wheels 6a-6d, so as to have association with the tire on one of the wheels 6a-6d. Each transceiver 2 works to sense the inflation pressure of the associated tire and transmit a frame of data that contains tire pressure information indicative of the sensed inflation pressure of the associated tire.

On the other hand, the receiver 3 is mounted on a body 7 of the vehicle 1. In the present invention, the body 7 means an assembly of all the remaining parts other than the wheels. The receiver 3 works to receive all the frames of data transmitted by the transceivers 2 and determine the inflation pressure of each of the four tires based on the tire pressure information contained in the received frames of data.

Figure 2:
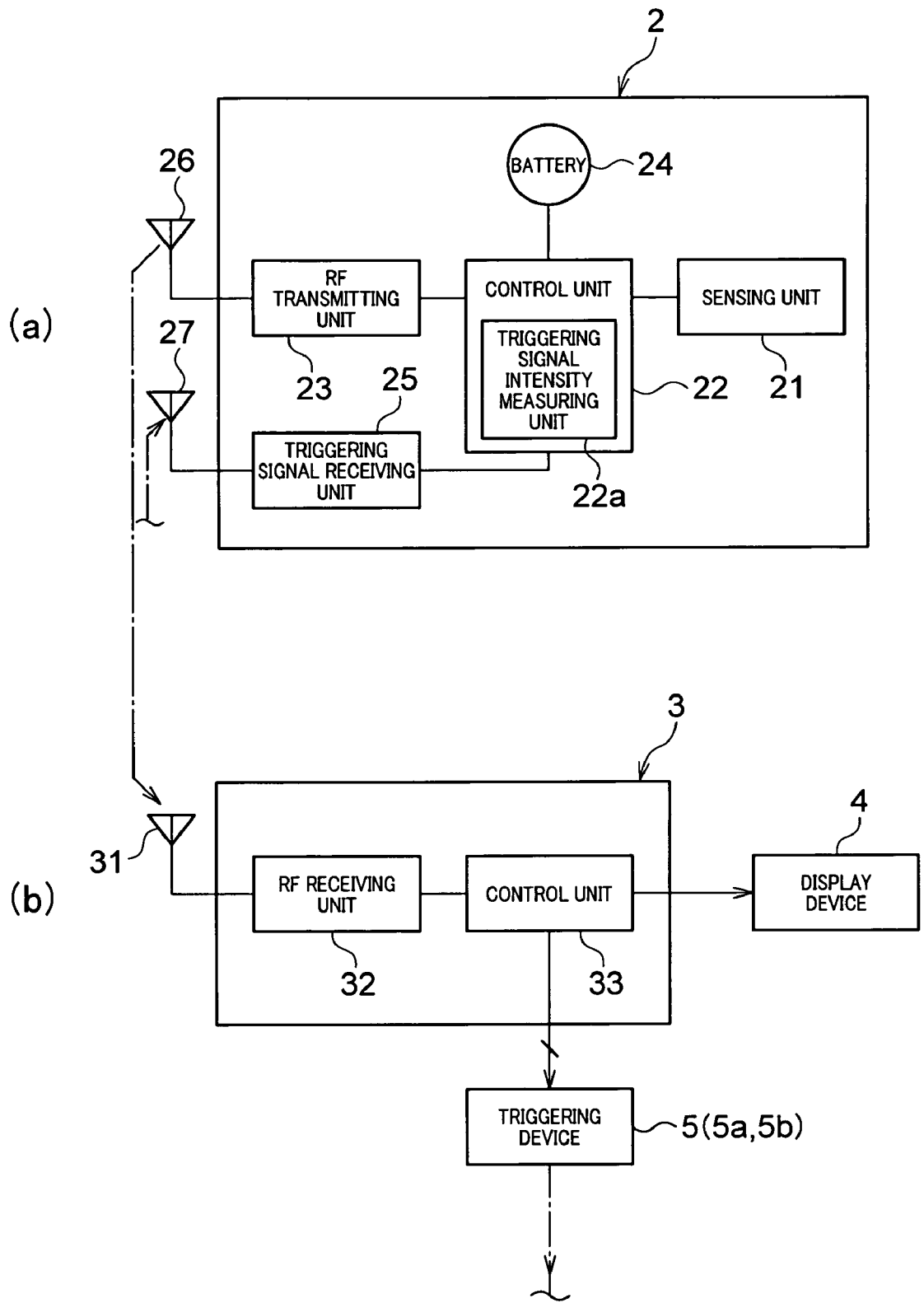
FIG. 2 is a block diagram illustrating each transceiver and a receiver of the tire inflation pressure detecting apparatus illustrated in FIG. 1.

FIGS. 2A and 2B show in block forms the configurations of each of the transceivers 2 and the receiver 3, respectively. As shown in FIG. 2(a), each transceiver 2 is configured with a sensing unit 21, a control unit 22, an RF (radio-frequency) transmitting unit 23, a battery 24, a triggering signal receiving unit 25, a transmitting antenna 26 and a receiving antenna 27. Of these, the control unit 22 serves as a first processing unit that performs various predetermined processes.

The sensing unit 21 is configured with sensors, such as a diaphragm-type pressure sensor and a temperature sensor, and works to output signals representative of the sensed inflation pressure of the tire and the sensed temperature of air in the tire.

The control unit (first control unit) 22 is made up of a known microcomputer having, for example, a CPU (Central Processing Unit), ROM (Read-Only Memory), RAM (Random Access Memory) and I/O(Input/Output) interfaces, and executes predetermined processes according to programs stored in the ROM, for example.

Specifically, the control unit 22 receives a detection signal associated with inflation pressure of the tire from the sensing unit 21. The received signal is then conditioned and, if necessary, processed by the control unit 22 and stored in a transmission frame in the form of data indicative of the results of detection (hereinafter referred to just as "inflation pressure data"), together with ID (Input/Output) interfaces information of the transceiver 2. The frame is then transmitted to the RF transmitting unit 23. The processes for transmitting a signal to the RF transmitting unit 23 is periodically executed according to the programs mentioned above.

When an ignition switch is in an off-state, the control unit 22 is normally in a sleep mode. However, upon reception of a triggering signal, followed by the input of a startup command contained in the triggering signal, the control unit 22 is switched to a wake-up mode. The control unit 22 is provided with a triggering signal intensity measuring unit 22a. When the control unit 22 is switched to a wake-up mode by receiving a triggering signal from the triggering device 5 through the receiving antenna 27 and the triggering signal receiving unit 25, the triggering signal intensity measuring unit 22a measures reception intensity of the triggering signal. Then, the control unit 22 processes the reception intensity data as required, stores the processed reception intensity data in the frame that has stored the inflation pressure data, or in a different frame, and transmits the frame to the RF transmitting unit 23. These processes of measuring the reception intensity of the triggering signal and transmitting the reception intensity data to the RF transmitting unit 23 are also performed according to the programs mentioned above.

The control unit 22 also controls timing for transmitting the frame to the RF transmitting unit 23. This control is purposed to prevent butting between transmission data coming from the individual transceivers 2. For example, transmission timing, that is, how many seconds later the frame should be transmitted after receiving the triggering signal, is differently preset for every transceiver 2. Accordingly, each frame is ensured to be transmitted at different timing from each of the transceivers 2 of the wheels 6a-6d.

However, the memory contents will become different between the individual transceivers 2, if merely the different transmission timing is stored in the control unit 2 of each of the transceivers 2 installed on the wheels 6a-6d for the purpose of ensuring transmission of the frames at different timing between the transceivers 2. In this regard, all the programs of the control units 22 can be shared between the transceivers 2 by offsetting the transmission timing between the frames according to the reception intensity. To this end, for example, a map may be prepared so that the transmission timing can be selected according to the reception intensity. Alternatively, a function formula may be stored in the control unit 22 to calculate the transmission timing using transmission intensity as a variable, so that the transmission timing is inevitably differentiated between the transceivers 2 by the different reception intensity.

Alternatively, the programs stored in the control unit 22 may be prepared in such a way that the transmission timing can be randomly changed at every occurrence. The random change of the transmission timing can ensure, with high probability, complete differentiation of the transmission timing between the transceivers 2.

The RF transmitting unit 23 transmits the frame transmitted from the control unit 22 to the receiver 3 through the transmitting antenna 26. The RF transmitting unit 23 functions as an output unit for transmitting the frame to the receiver 3 in RF band, or at 315 MHz, for example.

In this sense, the triggering signal receiving unit 25 functions as an input unit for receiving the triggering signal through the receiving antenna 27 and transmitting it to the control unit 22.

The battery 24 supplies power to the control unit 22, and the like. The power supply of the battery 24 enables, for example, collection of the inflation pressure data in the sensing unit 21 or calculations in the control unit 22.

The transceiver 2 configured in this way is attached, for example, to an air-charge valve of each of the wheels 6a-6d and arranged with the sensing unit 21 being exposed to the inside of the tire. Thus, it is so configured that an associated tire inflation pressure is detected to transmit the frame at every predetermined interval (e.g., every minute) through the transmitting antenna 26 provided at each of the transceivers 2.

As shown in FIG. 2(b), the receiver 3 includes an antenna 31, an RF receiving unit 32 and a control unit 33 which serves as a second processing unit that performs various predetermined processes.

The antenna 31, which is fixed to the vehicle body 7, is a single antenna shared between the individual transceivers 2. The antenna 31 receives all the frames transmitted from the individual transceivers 2.

Upon reception of the frames from the individual transceivers 2 by the antenna 31, the RF receiving unit 32 inputs these frames and transmits them to the control unit 33. The RF receiving unit 32 functions as an input unit.

The control unit 33 is made up of a known microcomputer having, for example, a CPU, ROM, RAM and I/O and executes predetermined processes according to programs stored in the ROM.

Specifically, the control unit 33 outputs a triggering command signal for commanding output of a triggering signal to the triggering device 5. At the same time, the RF receiving unit 32 receives the frames and performs wheel position detection. The detection is performed by specifying the correlation of each of the transmitted frames with the associated one of the transceivers 2 installed on the four wheels 6a-6d, on the basis of the reception intensity data of the triggering signal at the transceiver 2, which is stored in each of the frames.

Further, the control unit 33 performs signal processes and calculations based on the data indicative of the results of detection, which data is stored in each of the received frames. Through these processes and calculations, a tire inflation pressure is obtained. Then, an electrical signal corresponding to the obtained tire inflation pressure is outputted to the display device 4. For example, the control unit 33 compares the obtained tire inflation pressure with a predetermined threshold "Th". When it is detected, through the comparison, that the tire inflation pressure has been reduced, the control unit 33 outputs a signal accordingly to the display device 4. Thus, reduction of the tire inflation pressure of any of the four wheels 6a-6d can be transmitted to the display device 4.

As shown in FIG. 1, the display device 4 is disposed at a position for enabling the driver to visually recognize it. The display device 4 is made up, for example, of a warning lamp which is arranged in an instrumental panel in the vehicle 1. When, for example, a signal indicating reduction of a tire inflation pressure is transmitted from the control unit 33 of the receiver 3, the display device 4 indicates accordingly so as to warn the driver of the reduction of the tire inflation pressure.

Upon input of a triggering command signal transmitted from the control unit 33 of the receiver 3, the triggering device 5 outputs a triggering signal of predetermined signal intensity in LF (low-frequency) band ranging, for example, from 125 to 135 kHz. In the present embodiment, the triggering device consists of two triggering devices, i.e. a first triggering device 5a disposed on the side of the two front wheels, and a second triggering device 5b disposed on the side of the two rear wheels. For example, triggering signals having modes as shown in FIGS. 3A to 3C are usable.

Further, the trigging command signal is given to both the first and second triggering devices 5a and 5b at the same timing designed. Hence, both triggering devices 5a and 5b are able to simultaneously output the triggering signals in response to reception of the triggering command signal. Thus, in the present embodiment, the "simultaneity" of both triggering signals from the first and second triggering devices 5a and 5b means "simultaneity" depending on the design of the triggering command signal.

Figure 3A:
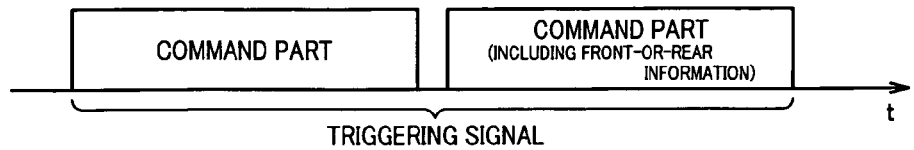
FIGS. 3A to 3C are pattern diagrams illustrating modes of triggering signals.

FIG. 3A shows a mode of a triggering signal, in which a plurality of frames each storing a command part are arranged. Each command part includes a startup command and an execution command. The startup command is fixed, in advance, as a command for switching the control unit 22 of the transceiver 22 from a sleep mode to a wake-up mode. The execution command includes information indicating which of the front wheels or rear wheels is aimed by the triggering signals (or information for identifying the triggering device 5 that has issued the triggering signals) and gives operation instructions. Specifically, the execution command allows the control unit 22 to measure the reception intensity of the received triggering signal. At the same time, the execution command allows, as required, the control unit 22 to process the reception intensity data, store the reception intensity data in the frame that has stored the inflation pressure data, or in a different frame, and then transmit the frame to the RF transmitting unit 23. For example, such a triggering signal may be an electromagnetic wave of 125 kHz. Upon reception of a frame storing a first command part, the transceiver 2 measures the reception intensity of the subsequent frame storing a second command part, to thereby achieve measurement of the reception intensity of the triggering signal. Exemplification here shows a triggering signal in which two frames, each storing a command part, are juxtaposed with each other. However, the number of the frames may be three or more. The interval between the frames may be intermittent as shown in FIG. 3A, or may be continuous. Front-or-rear information is included, here, in the execution command. However, the information may be included somewhere in the triggering signal, if the triggering signal can be ensured to be received after the control unit 22 has been switched to a wake-up mode.

Figure 3B:
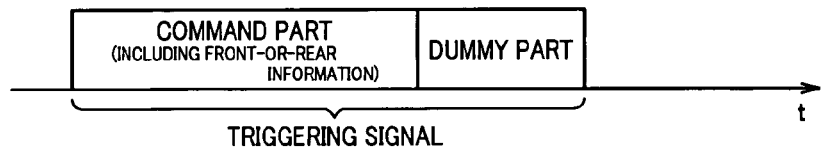
Figure 3C:
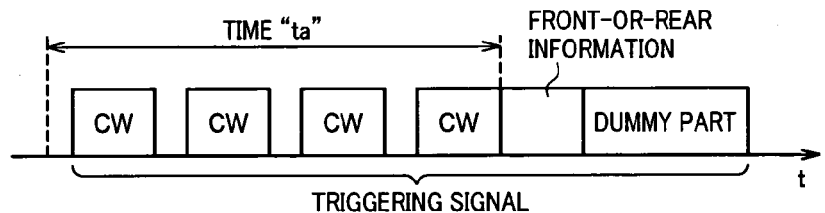

FIG. 3B shows modes of a triggering signal consisting of a frame which stores a command part and a dummy part. Similar to the above mode, the command part includes a startup command and an execution command (including front-or-rear information). The dummy part is used for reception intensity measurement, and thus may be served just by a modulated or nonmodulated carrier signal. For example, such a triggering signal may be an electromagnetic waveform of 125 kHz. Upon reception of the command part, the transceiver 2 measures the reception intensity of the subsequent dummy part to thereby achieve measurement of the reception intensity of the triggering signal.

FIG. 3C shows a mode of a triggering signal consisting of a frame which stores a pulse train of signals, front-or-rear information and a dummy part. The pulse train includes a predetermined number (e.g. four) of pulse signals CW in a fixed period "ta". The pulse train serves as a startup command for switching the transceiver 2 to a wake-up mode. The pulse signals CW may be AM-modulated signals or nonmodulated signals. Similar to the above mode, the dummy part is used for reception intensity measurement. For example, such a triggering signal may be an electromagnetic wave of 125 kHz. Upon reception of the predetermined number (four) of pulse signals CW within the fixed period "ta", the transceiver 2 measures the reception intensity of the subsequent dummy part to thereby achieve measurement of the reception intensity of the triggering signal.

The modes of the triggering signals in the figures are shown by way of example only, and thus those of other modes may be usable. For example, a frame may be divided for a triggering signal for pre-switching the transceiver 2 to a wake-up mode and a triggering signal for measuring the signal intensity. In this case, there is no need of using the triggering signal for the wake-up mode to perform the reception intensity measurement. Therefore, the signal intensity may be different from that of the triggering signal for reception intensity measurement. In case the transceiver 2 should be constantly in a wake-up mode, the startup command may be removed from the modes shown in FIGS. 3A and 3B and the remaining portions may be used as triggering signals.

The triggering devices 5a and 5b are disposed being offset from the center line which bilaterally symmetrically divides the vehicle 1, so that the triggering devices 5a and 5b have different distances to the respective corresponding wheels. In the present embodiment, the first triggering device 5a is disposed in the vicinity of the left-front wheel 6b, and the second triggering device 5b is disposed in the vicinity of the left-rear wheel 6d. Both of the triggering devices 5a and 5b are disposed on the left side of the center line. Accordingly, the distance from the first triggering device 5a to the right-front wheel 6a is larger than the distance from the first triggering device 5a to the left-front wheel 6b. Also, the distance from the second triggering device 5b to the right-rear wheel 6c is larger than the distance from the second triggering device 5b to the left-rear wheel 6d.

The positions for locating the first and second triggering devices 5a and 5b are determined in such a way that the distances from the transceivers 2 installed on the two front wheels 6a and 6b to the first triggering device 5a will be always smaller than the distances therefrom to the second triggering device 5b even when the two front wheels 6a and 6b are rotated, and that the distances from the transceivers 2 installed on the two rear wheels 6c and 6d to the second triggering device 5b will be always smaller than the distances therefrom to the first triggering device 5a even when the two front wheels 6c and 6d are rotated.

The triggering devices 5a and 5b may be located at any place whose perimeters are not entirely covered with metal. However, it is preferred that each of the triggering devices 5a and 5b is located, as much as possible, at a place which is not covered with metal, or in a place which will not be hit by stones or the like during traveling, such as in a liner interior or vehicle interior.

The description has so far been given on a configuration of the tire inflation pressure detecting apparatus in which the wheel position detecting apparatus of the present embodiment is applied.

Hereinafter will be described an operation of the tire inflation pressure detecting apparatus according to the present embodiment. The tire inflation pressure detecting apparatus carries out wheel position detection after the lapse of a predetermined period from when an ignition switch, not shown, is switched from an off-state to an on-state. The wheel position detection is carried out by allowing the control unit 33 of the receiver 3 to execute processes of the wheel so position detection.

Figure 4:
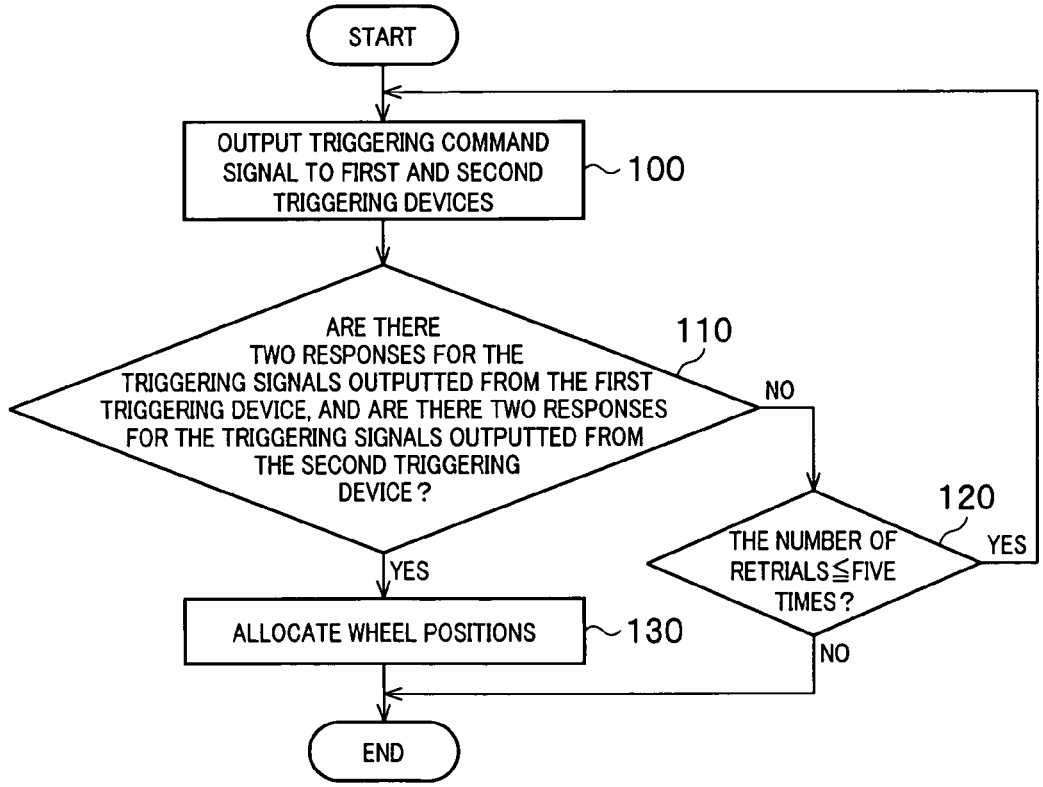
FIG. 4 is a flow diagram illustrating processes of wheel position detection executed by a control unit of each transceiver.

FIG. 4 is a flow diagram illustrating the wheel position detection processes executed by the control unit 33 of the receiver 3. The wheel position detection processes are executed when the ignition switch, not shown, is switched from an off-state to an on-state and power is supplied to the control unit 33 of the receiver 3.

At step 100, a triggering command signal is outputted to each of the first and second triggering devices 5a and 5b after the lapse of a predetermined period from when the power has been turned on. When the triggering command signal is inputted to each of the first and second triggering devices 5a and 5b, triggering signals each having a predetermined intensity are outputted from the first triggering device 5a to the transceivers 2 installed on the right- and left front wheels 6a and 6b. At the same time, triggering signals having a predetermined intensity are outputted from the second triggering device 5b to the transceivers 2 installed on the right- and left rear wheels 6c and 6d.

Thus, the triggering signals outputted from the first triggering device 5a are received by the transceivers 2 installed on the right- and left front wheels 6a and 6b. Also, the triggering signals outputted from the second triggering device 5b are received by the transceivers 2 installed on the right- and left rear wheels 6c and 6d. In this case, the triggering signals outputted from the second triggering device 5b may also reach the transceivers 2 installed on the right- and left front wheels 6a and 6b. However, since the triggering signals outputted from the first triggering device 5a simultaneously reach the right- and left front wheels 6a and 6b, only those triggering signals outputted from the first triggering device 5a are received by the transceivers 2 of the right- and left front wheels 6a and 6b. Similarly, the triggering signals outputted from the first triggering device 5a may also reach the transceivers 2 installed on the right- and left rear wheels 6c and 6d. However, since the triggering signals outputted from the second triggering device 5b simultaneously reach the right- and left rear wheels 6c and 6d, only those triggering signals outputted from the second triggering device 5b are received by the transceivers 2 of the right- and left rear wheels 6c and 6d. This mechanism will be explained below.

Generally, a receiver for receiving electromagnetic waves has the property of receiving only a stronger signal when the receiver has simultaneously been reached by two signals. Therefore, when the transceivers 2 are simultaneously reached by the triggering signals, which are electromagnetic waves, outputted from the first and second triggering devices 5a and 5b, the transceivers 2 receive only the triggering signals having stronger intensities.

In this way, the transceivers 2 installed on the right- and left front wheels 6a and 6b receive the triggering signals outputted from the first triggering device 5a. Also, the transceivers 2 installed on the right- and left rear wheels 6c and 6d receive the triggering signals outputted from the second triggering device 5b. Then, the triggering signals are inputted to the respective control units 22 through the respective receiving antennas 27 and triggering signal receiving units 25 of the respective transceivers 2. Each control unit 22 is then switched to a wake-up mode to have the received triggering signal measured by the triggering signal intensity measuring unit 22a.

Each triggering signal contains front-or-rear information for identifying either one of the first and second triggering devices 5a and 5b that has transmitted the triggering signal in question. Therefore, each transceiver 2 also makes a front-or-rear-wheel determination for itself. That is, each transceiver 2 determines whether the transceiver 2 itself is installed on the left/right-front wheel 6a/6b or the left/right-rear wheel 6c/6d, or whether the transceiver 2 itself is installed on the side of the front wheels or on the side of the rear wheels.

After calculating reception intensity of the triggering signal and making the front-or-rear-wheel determination, each transceiver 2 stores the results of the calculation and determination in a frame together with the ID information for identifying the transceiver 2 and transmits the frame to the receiver 3. The timing for transmitting the frames is differentiated between the individual transceivers 2. Therefore, the receiver 3 can reliably receive the frames transmitted from the individual transceivers 2 without causing radio interference.

Subsequently, at step 110, it is determined whether or not the two transceivers 2 has responded to the triggering signals outputted from the first triggering device 5a, and whether or not the two transceivers 2 has responded to the triggering signals outputted from the second triggering device 5b. Specifically, for the four transmitted frames, it is determined whether or not the results of the front-or-rear-wheel determination stored in the frames are two for the front wheels and two for the rear wheels.

If a negative determination is made at this step, control proceeds to step 120 where the above processes are retried. At the same time, the count of a counter; not shown, incorporated in the control unit 33 is incremented by "1" to store the number of retrials.

At step 120, it is determined whether or not the number of retrials is five or less. If the number is five or less, control returns to step 100 for retrial. If the number exceeds five, the processes are stopped without making further trial. In this case, it is considered that the transceivers 2 have failed or the battery has been exhausted. Such failure or exhaustion may be ensured to be notified through the display device 4.

On the other hand, if a positive determination is made at step 110, control proceeds to step 130. At step 130, wheel positions are allocated on the basis of the results of the front-or-rear-wheel determination and the reception intensity data stored in the received frames. In particular, at step 110, the reception intensity data, the results of the front-or-rear-wheel determination, and pieces of the ID information are read out of the received four frames. Then, the pieces of the ID information are arranged in the order of descending reception intensities, for each of the front wheels and the rear wheels.

In the pieces of the ID information for the front wheels, the one having higher reception intensity is identified as of the transceiver 2 installed on the left-front wheel 6b, and the one having lower reception intensity is identified as of the transceiver 2 installed on the right-front wheel 6a. After that, the pieces of the ID information stored in the respective frames are stored (registered) in a memory of the control unit 33, being correlated to the wheels on which the respective transceivers 2 are installed.

Similarly, in the pieces of the ID information for the rear wheels, the one having higher reception intensity is identified as of the transceiver 2 installed on the left-rear wheel 6d, and the one having lower reception intensity is identified as of the transceiver 2 installed on the right-rear wheel 6c. After that, the pieces of the ID information stored in the respective frames are stored (registered) in the memory of the control unit 33, being correlated to the wheels on which the respective transceivers 2 are installed. Thus, the wheel position detection processes are terminated.

In case of performing tire inflation pressure detection, which will be described later, the receiver 3 can first receive a frame that has stored the inflation pressure data, and then determine the transceiver 2 that has transmitted the frame from among the four transceivers 2 installed on the wheels 6a-6d, on the basis of the piece of the ID information stored in the frame. In this way, the inflation pressures of the wheels 6a-6d can be obtained. Thus, it is not necessary for the user to carry out operations, such as reading out the ID information, in order to determine one of the wheels 6a-6d, on which the associated transceiver 2 is installed.

Subsequent to the wheel position detection, the tire inflation pressure detecting apparatus carries out the tire inflation pressure detection.

In particular, the tire inflation pressure detecting apparatus is switched to a regular transmission mode. Then, in each transceiver 2, detection signals indicating an inflation pressure of the tire and a temperature in the tire are inputted from the sensing unit 21 to the control unit 22, as described above. These detection signals are then processed, as required, so as to be used as the inflation pressure data, stored in a frame together with the ID information of the transceiver 2, and transmitted to the side of the receiver 3 through the RF transmitting unit 23 in a periodical manner.

On the other hand, the frame transmitted from the transceiver 2 is received by the antenna 31 of the receiver 3 and inputted to the control unit 33 through the RF receiving unit 32. In the control unit 33, the inflation pressure data and the temperature data of the tire are extracted from the received frame. Then, as required, temperature correction is carried out on the basis of the temperature data to obtain a tire inflation pressure. In this case, the ID information stored in the frame is checked against the ID information that has been stored during the wheel position detection to determine the associated transceiver 2 that has transmitted the frame, from among the four transceivers 2 installed on the respective wheels 6a-6d.

When the change of the inflation pressure of the tire is small, or when a difference between the inflation pressures obtained this time and the previously obtained inflation pressure does not exceed a predetermined threshold, the interval of the inflation pressure detection remains as it is (e.g., every minute). When the change of the inflation pressure is large, or when the difference exceeds the predetermined threshold, the interval is shortened (e.g., every five seconds).

Eventually, when the obtained inflation pressure is determined as being lower than the predetermined threshold, a signal is outputted accordingly to the display device 4 from the control unit 33. In this case, the indication on the display device 4 is made in a manner that can identify the wheel having the tire with the reduced inflation pressure, from among the four wheels 6a-6d. In this way, the driver can be notified which of the wheels 6a-6d has the tire with reduced inflation pressure.

Finally, when the ignition switch is turned from an on-state to an off-state, the control unit 33 of the receiver 3 again outputs a triggering command signal to the triggering device 5, which in turn outputs a triggering signal When the triggering signal is inputted to the control unit 22 through the receiving antenna 27 and the triggering signal receiving unit 25, the transceiver 2 is switched to a sleep mode. Thus, the inflation pressure detection of the tire inflation pressure detecting apparatus is terminated.

According to the tire inflation pressure detecting apparatus provided with the wheel position detecting apparatus of the present embodiment, triggering signals can be simultaneously outputted from the first triggering device 5a for the front wheels and the second triggering device 5b for the rear wheels. Then, the transceivers 2 installed on the right- and left front wheels 6a and 6b can receive only the triggering signals outputted from the first triggering device 5a, and the transceivers 2 installed on the right- and left rear wheels 6c and 6d can receive only the triggering signals outputted from the second triggering device 5b.

Thus, the wheel position detecting apparatus can detect the correlation of the four transceivers 2 with the respective four wheels 6a-6d without the need of the user's operation for reading out the ID information. In addition, the wheel position detecting apparatus makes it possible to mitigate the complicated operation of wheel position detection, which is ascribed to the unwanted reception of triggering signals by those transceivers which are not desired to receive the triggering signals.

Second Embodiment

Hereinafter will be described a second embodiment of the present invention. The second embodiment is different from the first embodiment in that it has another arrangement of the first and second triggering devices 5a and 5b.

Figure 5:
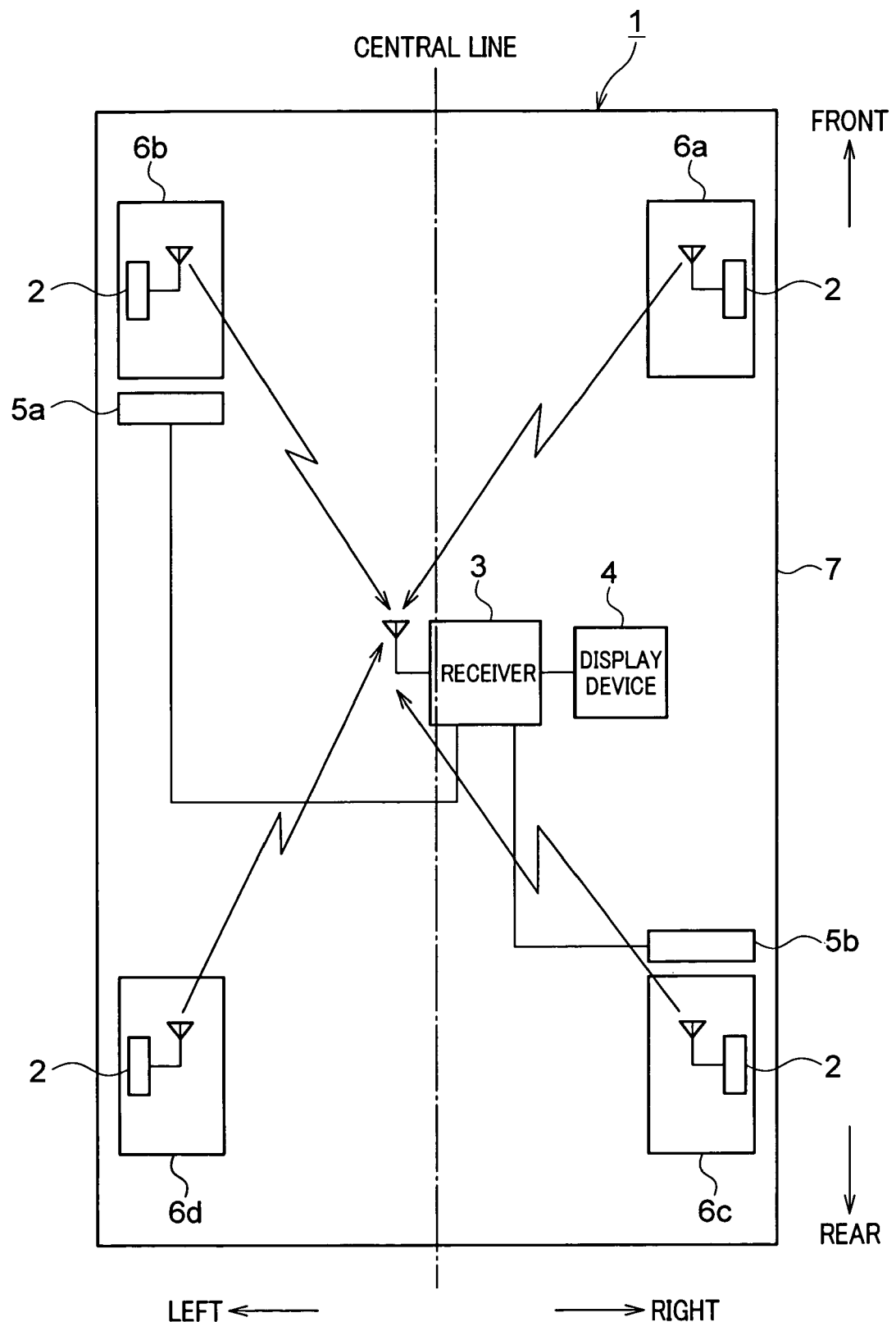
FIG. 5 is a block diagram generally illustrating a tire inflation pressure detecting apparatus, in which a wheel position detecting apparatus is applied, according to a second embodiment of the present invention.

FIG. 5 is a pattern diagram illustrating an arrangement of the first and second triggering devices 5a and 5b. As shown in the figure, the first triggering device 5a is arranged, as in the first embodiment, being offset from the center line of the vehicle 1 and being closer to the left-front wheel 6b than to the right-front wheel 6a. The second triggering device 5b is arranged also being offset from the center line of the vehicle 1 but, unlike the first embodiment, being closer to the right-rear wheel 6c than to the left-rear wheel 6d. Specifically, it is so arranged that a diagonal positional relationship is established between the left-front wheel 6b in the two front wheels 6a and 6b, which is located close to the first triggering device 5a, and the right-rear wheel 6c in the two rear wheels 6c and 6d, which is located close to the second triggering device 5b.

As described above, triggering signals can be simultaneously outputted from the first triggering device 5a for the front wheels and the second triggering device 5b for the rear wheels. Then, the transceivers 2 installed on the right- and left front wheels 6a and 6b can receive only the triggering signals outputted from the first triggering device 5a. Similarly, the transceivers 2 installed on the right- and left-rear wheels 6c and 6d can receive only the triggering signals outputted from the second triggering device 5b. In this way, the transceivers 2 installed on the two front wheels 6a and 6b can be identified by the triggering signals outputted from the first triggering device 5a. Similarly, the transceivers 2 installed on the two rear wheels 6c and 6d can be identified by the triggering signals outputted from the second triggering device 5b. Accordingly, the positional relationship between the first and second triggering devices 5a and 5b can be uniquely established without the necessity of considering the mutual positional relationship. Thus, the arrangement of the present embodiment can achieve the advantages similar to those of the first embodiment.

This mode of arrangement in which the triggering devices 5a and 5b are disposed on both of the right- and left sides, respectively, may balance the weight of the triggering devices 5a and 5b and wire harnesses linked thereto, between the right- and left of the vehicle 1. Thus, the weight of the vehicle 1 can be well balanced between left and right. In case of the door control based on a smart entry system, the door control is performed by allowing a triggering device provided in the vehicle 1 to output a triggering signal, and allowing a smart key possessed by the user to output a check signal when the smart key has received the triggering signal. In this case, the vehicle 1 is required to be provided with the triggering device on both the left and right sides. In this regard, the first and second triggering devices of the present embodiment, which are disposed left and right of the vehicle 1, can also serve as the triggering devices for outputting triggering signals in the smart entry system. Drawing the wire harnesses from the receiving unit 3 to the triggering device 5 may often be limited due to the convenience (e.g., arrangement of other parts) of the vehicle 1. In this case as well, the first and second triggering devices 5a and 5b can be positioned in conformity with the convenience of the vehicle 1.

Third Embodiment

Hereinafter will be described a third embodiment of the present invention. The third embodiment is also different from the first embodiment in that it has still another arrangement of the first and second triggering devices 5a and 5b.

Figure 6:
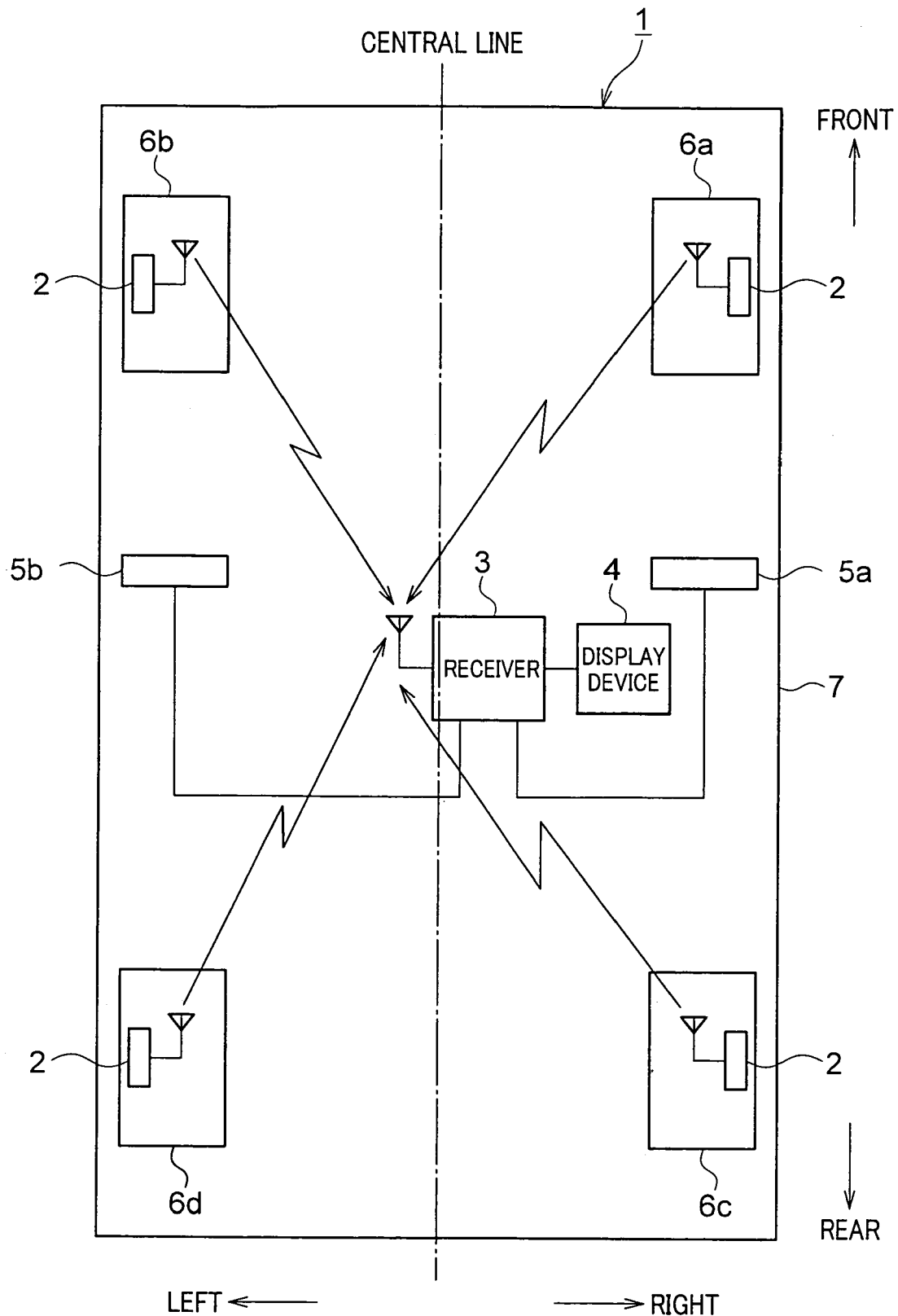
FIG. 6 is a block diagram generally illustrating a tire inflation pressure detecting apparatus to which a wheel position detecting apparatus is applied, according to a third embodiment of the present invention.

FIG. 6 is a pattern diagram illustrating an arrangement of the first and second triggering devices 5a and 5b of the present embodiment. In the above embodiments, the first triggering device 5a has been arranged on the side of the two front wheels 6a and 6b, while the second triggering device 5b has been arranged on the side of the two rear wheels 6c and 6d. Thus, the first triggering device 5a has been adapted to output the triggering signals toward a pair of the right- and left front wheels 6a and 6b. Similarly, the second triggering device 5b has been adapted to output the triggering signals toward a pair of the right- and left-rear wheels 6c and 6d.

On the other hand, as shown in FIG. 6, the first triggering device 5a may be disposed on the side of the two right wheels 6a and 6c, and the second triggering device 5b may be disposed on the side of the two left wheels 6b and 6d. In this way, a pair of the right wheels 6a and 6c may be adapted to receive the triggering signals only from the first triggering device 5a, and a pair of the left wheels 6b and 6d may be adapted to receive the triggering signals only from the second triggering device 5b. In this case, the first triggering device 5a can be disposed being closer to one of the right wheels 6a and 6c than to the other, and the second triggering device 5b may be disposed being closer to one of the left wheels 6b and 6d than to the other. Thus, the reception intensities can be differentiated between the triggering signals outputted from each of the first and second triggering devices 5a and 5b to thereby attain the same advantages as in the above embodiments. Further, the triggering signals outputted from the first triggering device 5a may be provided with information (left-or-right information) indicating that the triggering signals in question are for the right wheels. Similarly, the triggering signals outputted from the second triggering device 5b may be provided with information (left-or-right information) indicating that the triggering signals in question are for the left wheels. In this way, the individual transceivers 2 can identify whether the wheels they are installed on are the two right wheels 6a and 6c or the two left wheels 6b and 6d.

Thus, even when the arrangement of the first and second triggering devices 5a and 5b is changed, each of the transceivers 2 can identify on which of the four wheels 6a-6d the associated transceiver 2 is installed, on the basis of the triggering command of the triggering signal outputted from the triggering device 5 and the reception intensity. As a result, the advantages similar to those of the first embodiment can be achieved.

Other Embodiments

The embodiments described above have included the antenna 31 that serves as a single antenna shared between the transceivers. Alternative to this, four antennas may be provided for the respective wheels 6a-6d. However, the present embodiment can be effectively applied in the case where the antenna 31 is used as a single antenna shared between the transceivers because, in this case, it becomes particularly difficult to specify the wheels 6a-6d on which the transceivers 2 are installed.

The embodiments described above have been configured to perform the wheel position detection after the lapse of a predetermined period from when the ignition switch has been turned from an off-state to an on-state. Therefore, even when the tires of the vehicle 1 appear to be in normal conditions, it is possible to detect the already caused blowout or the abnormally reduced inflation pressure of the tires before the driver drives the vehicle 1. However, the wheel position detection may be conducted on the occasion other than this. For example, the detection may be conducted after rotating the positions of the tires or after changing the tires. The fact of rotating the positions of the tires or changing the tires can be detected by detecting an inclination of the vehicle body 7. The inclination can be detected, for example, by depressing a switch, not shown, for the wheel position detection, or by setting an inclination sensor at the vehicle body.

The embodiment 1 has indicated a case where the first and second triggering devices 5a and 5b are both disposed on the left side of the vehicle 1. The triggering devices, however, may alternatively be disposed on the right side. Further, the second embodiment has indicated a case where the first triggering device 5a is disposed on the side of the left-front wheel 6b and the second triggering device 5b is disposed on the side of the right-rear wheel 6c. Alternatively, however, the first triggering device 5a may be disposed on the side of the right-front wheel 6a and the second triggering device 5b may be disposed on the side of the left-rear wheel 6d.

In each of the above embodiments described above, the embodiment has been applied to a four-wheel vehicle. However, the application is not limited to a four-wheel vehicle. For example, the present invention can also be applied to a wheel position detecting apparatus and a tire inflation pressure detecting apparatus for those vehicles which have four or more wheels, such as heavy vehicles.

What is claimed is:

1. An apparatus for detecting positions of a plurality to wheels of a vehicle, the wheels including right and left front wheels and right and left rear wheels and being attached to a body of the vehicle, comprising:

a first triggering device attached to the body to output a triggering signal including information indicating that the triggering signal from the first trigging device is for the front wheels;

a second trigging device attached to the body to output a triggering signal including information indicating that the triggering signal from the second trigging device is for the rear wheels;

a plurality of transceivers respectively attached to the front and rear four wheels, each of the transceivers being configured to receive the triggering signal, calculate a reception intensity of the triggering signal, store, into a frame to be transmitted, both data indicating the reception intensity and the information indicating that the triggering signal is for either the front or rear wheels, and transmit the frame processed; and a first receiver attached to the body and provided with a second receiver that receives the frame transmitted from the transceivers and a first processing unit that processes the received frame to read out both the data and the information from the received frame and use the read-out data and information so as to detect the positions of the wheels by determining which transceiver is attached to which wheel, wherein the first and second triggering devices are configured to output the triggering signals simultaneously.

2. The apparatus of claim 1, wherein the first processing unit comprises first means for determining that, of the two data indicating the reception intensities stored in the frames in which the information showing the front wheels is included, one of the two front-wheel-side transceivers which has sent the frame including the reception intensity greater than that of the other transceiver is disposed at one of the right and left front wheels which is closer to the first triggering device than the other transceiver and the other transceiver is thus disposed at the other of the right and left front wheels which is farther from the first triggering device than the one transceiver; and second means for determining that, of the two data indicating the reception intensities stored in the frames in which the information showing the rear wheels is included, one of the two rear-wheel-side transceivers which has sent the frame including the reception intensity greater than that of the other transceiver is disposed at one of the right and left rear wheels which is closer to the second triggering device than the other transceiver and the other transceiver is thus disposed at the other of the right and left rear wheels which is farther from the second triggering device than the one transceiver.

3. The apparatus of claim 2, wherein each of the transceivers comprises a third receiver that receives the triggering signal, a second processing unit that calculates the reception intensity and storing both the data and information into the frame, and a transmitter that transmits the frame processed by the second processing unit.

4. The apparatus of claim 2, wherein the first processing unit is configured to produce a command signal to be given to the first and second triggering devices so that the first and second triggering devices output the triggering signals simultaneously.

5. An apparatus for detecting positions of a plurality to wheels of a vehicle, the wheels including right front and rear wheels and left front and rear wheels and being attached to a body of the vehicle, comprising:

a first triggering device attached to the body to output a triggering signal including information indicating that the triggering signal from the first trigging device is for the right wheels;

a second trigging device attached to the body to output a triggering signal including information indicating that the triggering signal from the second trigging device is for the left wheels;

a plurality of transceivers respectively attached to the front and rear four wheels, each of the transceivers being configured to receive the triggering signal, calculate a reception intensity of the triggering signal, store, into a frame to be transmitted, both data indicating the reception intensity and the information indicating that the triggering signal is for either the right or left wheels, and transmit the frame processed; and a first receiver attached to the body and provided with a second receiver that receives the frame transmitted from the transceivers and a first processing unit that processes the received frame to read out both the data and the information from the received frame and use the read-out data and information so as to detect the positions of the wheels by determining which transceiver is attached to which wheel, wherein the first and second triggering devices are configured to output the triggering signals simultaneously.

6. The apparatus of claim 5, wherein the first processing unit comprises:

first means for determining that, of the two data indicating the reception intensities stored in the frames in which the information showing the right wheels is included, one of the two right-wheel-side transceivers which has sent the frame including the reception intensity greater than that of the other transceiver is disposed at one of the right front and rear wheels which is closer to the first triggering device than the other transceiver and the other transceiver is thus disposed at the other of the right front and rear wheels which is farther from the first triggering device than the one transceiver; and second means for determining that, of the two data indicating the reception intensities stored in the frames in which the information showing the left wheels is included, one of the two left-wheel-side transceivers which has sent the frame including the reception intensity greater than that of the other transceiver is disposed at one of the left front and rear wheels which is closer to the second triggering device than the other transceiver and the other transceiver is thus disposed at the other of the left front and rear wheels which is farther from the second triggering device than the one transceiver.

7. The apparatus of claim 6, wherein each of the transceivers comprises a third receiver that receives the triggering signal, a second processing unit that calculates the reception intensity and storing both the data and information into the frame, and a transmitter that transmits the frame processed by the second processing unit.

8. The apparatus of claim 6, wherein the first processing unit is configured to produce a command signal to be given to the first and second triggering devices so that the first and second triggering devices output the triggering signals simultaneously.

9. An apparatus for detecting inflation pressure of tires provided at a plurality of wheels of a vehicle, the wheels including right and left front wheels and right and left rear wheels (6c, 6d) and being attached to a body of the vehicle, comprising:

a first triggering device attached to the body to output a triggering signal including information indicating that the triggering signal from the first trigging device is for the front wheels;

a second trigging device attached to the body to output a triggering signal including information indicating that the triggering signal from the second trigging device is for the rear wheels, wherein the first and second triggering devices are formed to output the triggering signals simultaneously;

a plurality of transceivers respectively attached to the front and rear four wheels, each of the transceivers comprising a sensing unit that senses inflation pressure of each tire and outputting a sensing signal indicative of the inflation pressure, a first receiver that receives the triggering signal, a first processing unit that calculates the reception intensity, processes the sensing signal, and stores, into a frame to be transmitted, the data, the information indicating that the triggering signal is for either the front or rear wheels, and the processed sensing signal, and a transmitter that transmits the frame processed by the first processing unit; and a second receiver attached to the body and provided with a third receiver that receives the frame transmitted from the transceivers and a second processing unit that i) processes the received frame to read out both the data and the information from the received frame and ii) use the read-out data and information so as to detect the positions of the wheels by determining which transceiver is attached to which wheel, and iii) calculates the inflation pressure of each tire based on the sensing signal stored in the frame.

10. The apparatus of claim 9, wherein the second processing unit comprises:

first means for determining that, of the two data indicating the reception intensities stored in the frames in which the information showing the front wheels is included, one of the two front-wheel-side transceivers which has sent the frame including the reception intensity greater than that of the other transceiver is disposed at one of the right and left front wheels which is closer to the first triggering device than the other transceiver and the other transceiver is thus disposed at the other of the right and left front wheels which is farther from the first triggering device than the one transceiver; and second means for determining that, of the two data indicating the reception intensities stored in the frames in which the information showing the rear wheels is included, one of the two rear-wheel-side transceivers which has sent the frame including the reception intensity greater than that of the other transceiver is disposed at one of the right and left rear wheels which is closer to the second triggering device than the other transceiver and the other transceiver is thus disposed at the other of the right and left rear wheels which is farther from the second triggering device than the one transceiver.

11. The apparatus of claim 10, wherein the second processing unit is configured to produce a command signal to be given to the first and second triggering devices so that the first and second triggering devices output the triggering signals simultaneously.

12. An apparatus for detecting inflation pressure of tires provided at a plurality of wheels of a vehicle, the wheels including right front and rear wheels and left front and rear wheels and being attached to a body of the vehicle, comprising:

a first triggering device attached to the body to output a triggering signal including information indicating that the triggering signal from the first trigging device is for the right wheels;

a second triggering device attached to the body to output a triggering signal including information indicating that the triggering signal from the second trigging device is for the left wheels, wherein the first and second triggering devices are configured to output the triggering signals simultaneously;

a plurality of transceivers respectively attached to the right and left four wheels, each of the transceivers comprising a sensing unit that senses inflation pressure of each tire and outputting a sensing signal indicative of the inflation pressure, a first receiver that receives the triggering signal, a first processing unit that calculates the reception intensity, processes the sensing signal, and stores, into a frame to be transmitted, the data, the information indicating that the triggering signal is for either the right or left wheels, and the processed sensing signal, and a transmitter that transmits the frame processed by the first processing unit; and a second receiver attached to the body and provided with a third receiver that receives the frame transmitted from the transceivers and a second processing unit that i) processes the received frame to read out both the data and the information from the received frame and ii) use the read-out data and information so as to detect the positions of the wheels by determining which transceiver is attached to which wheel, and iii) calculates the inflation pressure of each tire based on the sensing signal stored in the frame.

13. The apparatus of claim 12, wherein the second processing unit comprises first means for determining that, of the two data indicating the reception intensities stored in the frames in which the information showing the right wheels is included, one of the two right-wheel-side transceivers which has sent the frame including the reception intensity greater than that of the other transceiver is disposed at one of the right front and rear wheels which is closer to the first triggering device than the other transceiver and the other transceiver is thus disposed at the other of the right front and rear wheels which is farther from the first triggering device than the one transceiver; and second means for determining that, of the two data indicating the reception intensities stored in the frames in which the information showing the left wheels is included, one of the two left-wheel-side transceivers which has sent the frame including the reception intensity greater than that of the other transceiver is disposed at one of the left front and rear wheels which is closer to the second triggering device than the other transceiver and the other transceiver is thus disposed at the other of the left front and rear wheels which is farther from the second triggering device than the one transceiver.

14. The apparatus of claim 13, wherein the second processing unit is configured to produce a command signal to be given to the first and second triggering devices so that the first and second triggering devices output the triggering signals simultaneously.

15. A transceiver disposed at each of a plurality of wheels of a vehicle, the wheels including right and left front wheels and right and left rear wheels, comprising:

a receiver that receives a triggering signal outputted from a triggering device, the triggering signal including either information indicating that the triggering signal is for the front wheels or information indicating the that triggering signal is for the rear wheels, the trigging signal for the front wheels and the triggering signal for the rear wheels being outputted simultaneously;

a processing unit that calculate a reception intensity of the triggering signal, stores, into a frame to be transmitted, both data indicating the reception intensity and the information indicating that the triggering signal is for either the front or rear wheels, and transmits the frame processed; and a transmitter that transmits the frame processed.

16. A transceiver disposed at each of a plurality of wheels of a vehicle, the wheels including right front and rear wheels and left front and rear wheels, comprising:

a receiver that receives a triggering signal outputted from a triggering device, the triggering signal including either information indicating that the triggering signal is for the right wheels or information indicating the that triggering signal is for the left wheels, the trigging signal for the right wheels and the triggering signal for the left wheels being outputted simultaneously;

a processing unit that calculate a reception intensity of the triggering signal, stores, into a frame to be transmitted, both data indicating the reception intensity and the information indicating that the triggering signal is for either the right or left wheels, and transmits the frame processed; and a transmitter that transmits the frame processed.

17. A receiver attached to a body of a vehicle, the vehicle being provided with a plurality of wheels including right and left front wheels and right and left rear wheels, the wheels each being provided with a transceiver that sends out a frame of data, the frame storing reception intensity data of a triggering signal, the receiver comprising:

a receiving unit that receives the frame; and a processing unit that i) simultaneously outputs command signals to first and second triggering devices, the first triggering device being in charge of outputting the triggering signal including information showing that the triggering signal is for the front wheels and the second triggering device being in charge of outputting the triggering signal including information showing that the triggering signal is for the rear wheels;

ii) accepts the four frames transmitted from the four transceivers through the receiving unit; and iii) determines that which transceiver is attached to which wheel on the basis of both the information shown by the triggering signal and the reception intensity data stored in each of the frames accepted.

18. The receiver of claim 17, wherein the processing unit comprises first means for determining that, of the two data indicating the reception intensities stored in the frames in which the information showing the front wheels is included, one of the two front-wheel-side transceivers which has sent the frame including the reception intensity greater than that of the other transceiver is disposed at one of the right and left front wheels which is closer to the first triggering device than the other transceiver and the other transceiver is thus disposed at the other of the right and left front wheels which is farther from the first triggering device than the one transceiver; and second means for determining that, of the two data indicating the reception intensities stored in the frames in which the information showing the rear wheels is included, one of the two rear-wheel-side transceivers which has sent the frame including the reception intensity greater than that of the other transceiver is disposed at one of the right and left rear wheels which is closer to the second triggering device than the other transceiver and the other transceiver is thus disposed at the other of the right and left rear wheels which is farther from the second triggering device than the one transceiver.

19. A receiver attached to a body of a vehicle, the vehicle being provided with a plurality of wheels including right front and rear wheels and left front and rear wheels, the wheels each being provided with a transceiver that sends out a frame of data, the frame storing reception intensity data of a triggering signal, the receiver comprising:

a receiving unit that receives the frame; and a processing unit that i) simultaneously outputs command signals to first and second triggering devices, the first triggering device being in charge of outputting the triggering signal including information showing that the triggering signal is for the right wheels and the second triggering device being in charge of outputting the triggering signal including information showing that the triggering signal is for the left wheels;

ii) accepts the four frames transmitted from the four transceivers through the receiving unit; and iii) determines that which transceiver is attached to which wheel on the basis of both the information shown by the triggering signal and the reception intensity data stored in each of the frames accepted.

20. The receiver of claim 19, wherein the processing unit comprises first means for determining that, of the two data indicating the reception intensities stored in the frames in which the information showing the right wheels is included, one of the two right-wheel-side transceivers which has sent the frame including the reception intensity greater than that of the other transceiver is disposed at one of the right front and rear wheels which is closer to the first triggering device than the other transceiver and the other transceiver is thus disposed at the other of the right front and rear wheels which is farther from the first triggering device than the one transceiver; and second means for determining that, of the two data indicating the reception intensities stored in the frames in which the information showing the left wheels is included, one of the two left-wheel-side transceivers which has sent the frame including the reception intensity greater than that of the other transceiver is disposed at one of the left front and rear wheels which is closer to the second triggering device than the other transceiver and the other transceiver is thus disposed at the other of the left front and rear wheels which is farther from the second triggering device than the one transceiver.

* * * * *

UNITED STATES PATENT AND TRADEMARK OFFICE
CERTIFICATE OF CORRECTION

| | | |
|---|---|---|
| PATENT NO. | : 7,817,025 B2 | |
| APPLICATION NO. | : 11/963238 | |
| DATED | : October 19, 2010 | |
| INVENTOR(S) | : Mori et al. | |

It is certified that error appears in the above-identified patent and that said Letters Patent is hereby corrected as shown below:

Title page item (57), in the Abstract, line 4, "trigging" should be --triggering--.

In column 7, line 24, "trigging" should be --triggering--;

In patent claim 1, at column 14, lines 62, 64 and 66, "trigging" should be --triggering--;

In patent claim 5, at column 15, lines 60, 62 and 64, "trigging" should be --triggering--;

In patent claim 9, at column 16, lines 60, 62 and 64, "trigging" should be --triggering--;

In patent claim 12, at column 17, lines 63, 65 and 67, "trigging" should be --triggering--;

In patent claim 15, at column 18, line 65, "trigging" should be --triggering--;

In patent claim 16, at column 19, line 15, "trigging" should be --triggering--.

Signed and Sealed this
Twenty-second Day of March, 2011

David J. Kappos
*Director of the United States Patent and Trademark Office*